(12) United States Patent
Fisher et al.

(10) Patent No.: US 10,409,645 B2
(45) Date of Patent: *Sep. 10, 2019

(54) MANAGING MAINTENANCE OPERATIONS IN MULTI-MACHINE CONFIGURATIONS

(71) Applicant: International Business Machines Corporation, Armonk, NY (US)

(72) Inventors: Bradford A. Fisher, Chapel Hill, NC (US); James K. MacKenzie, Scotland (GB); Dominic O'Toole, Ireland (IR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,536

(22) Filed: May 8, 2018

(65) Prior Publication Data
US 2018/0260254 A1 Sep. 13, 2018

Related U.S. Application Data

(63) Continuation of application No. 15/142,726, filed on Apr. 29, 2016, now Pat. No. 9,996,395.

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4843* (2013.01)

(58) Field of Classification Search
None
See application file for complete search history.

(56) References Cited

PUBLICATIONS

List of IBM Patents or Applications Treated as Related, 2018.

*Primary Examiner* — Gregory A Kessler
(74) *Attorney, Agent, or Firm* — Garg Law Firm, PLLC; Rakesh Garg; Jeffrey S LaBaw

(57) ABSTRACT

A plan including several groups of tasks is constructed for performing maintenance on a plurality of interrelated machines. A maintenance task in a first group is caused to execute within a window of time allocated for the maintenance. A determination is made that an estimated amount of time needed to execute a second group of tasks from the several groups is more than the remaining time in the window. In response to such a determination, the execution of the second group of tasks is omitted. The execution of a post-requisite task of the first group is completed. A maintenance task in the second group is executed during a second window of time allocated for the maintenance.

20 Claims, 8 Drawing Sheets

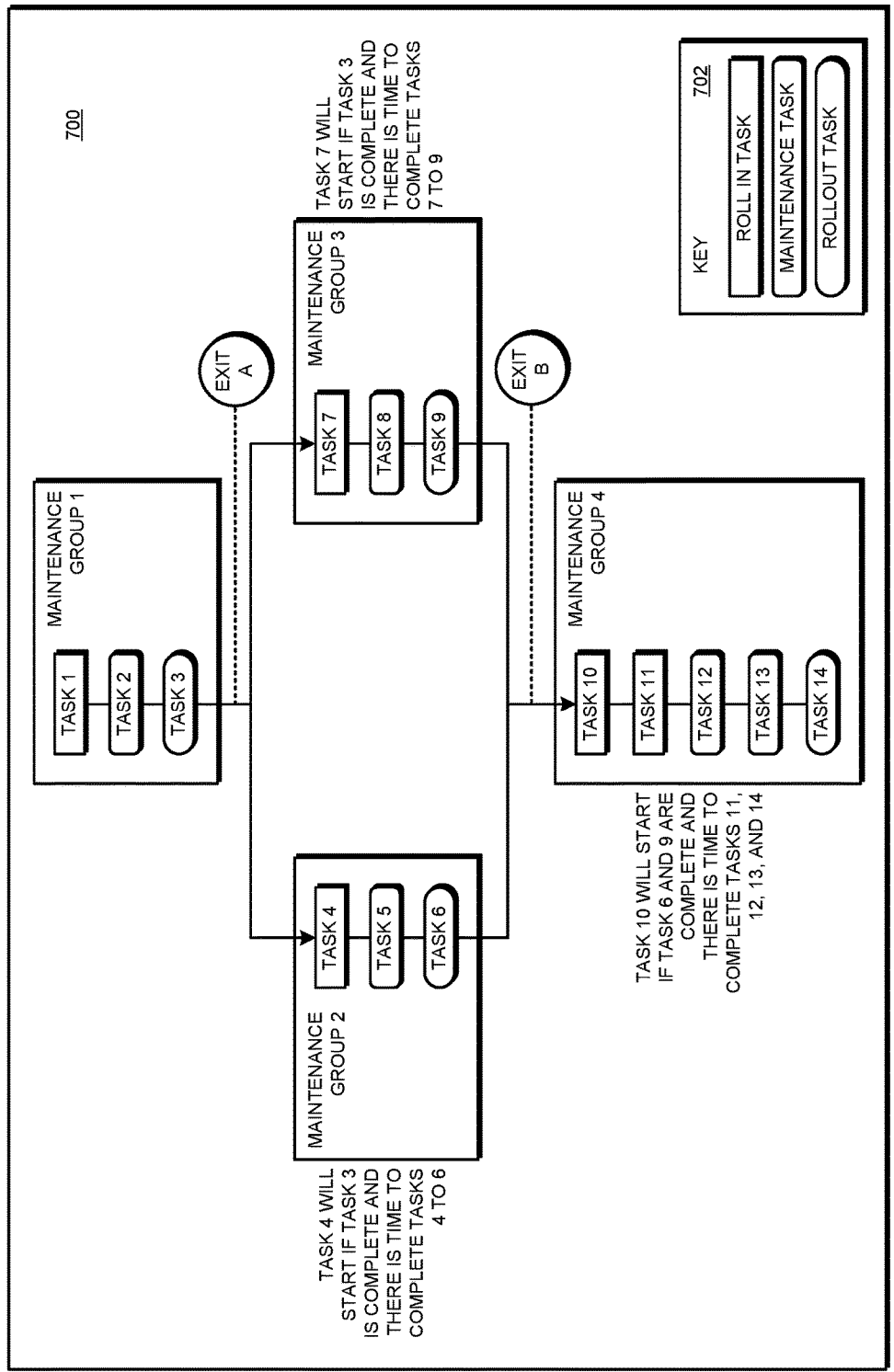

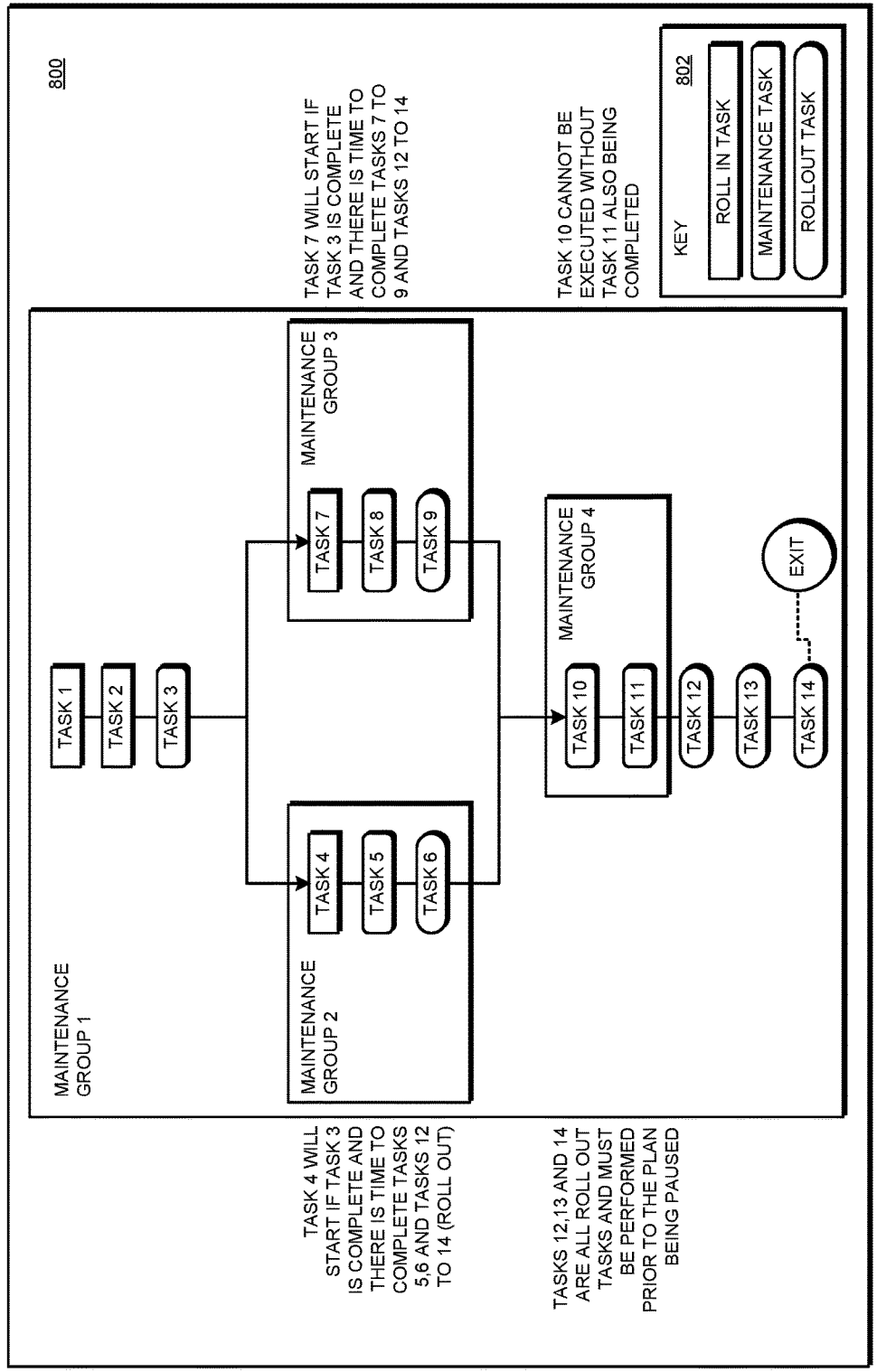

MANAGING MAINTENANCE OPERATIONS IN MULTI-MACHINE CONFIGURATIONS

TECHNICAL FIELD

The present invention relates generally to a method, system, and computer program product for performing system maintenance operations in large scale data processing environments. More particularly, the present invention relates to a method, system, and computer program product for managing maintenance operations in multi-machine configurations.

BACKGROUND

A maintenance window is a window of time in which a system or systems can be removed from their respective configured operations and maintenance operations can be performed on such system or systems. Normal configured operations may include, but are not limited to operating as an application server or one of several application servers serving a business application, a database server or one of several database servers serving a database, a web server or one of several web servers serving a website functionality, a virtual machine (VM) or one of several VMs processing a workload, a physical computer or one of several physical computers serving one or more customer functions, or some combination of these and other operations. A maintenance operation may include, but is not limited to applying a software patch, installing new or updated software, adding or changing a hardware component, adding or changing a system configuration, adding or changing a system management component, and the like.

Within the scope of the illustrative embodiments, a "machine" is a computer system or a hardware or software portion thereof, arranged as a physical computing device or a VM. Presently, when a machine needs maintenance, a maintenance window is configured for that machine. This method is acceptable for maintaining a single machine which does not have any interdependency with other virtual or physical machines.

The illustrative embodiments recognize that machines often collaborate with other machines or otherwise have some interdependencies with one or more other machines. This is especially true of machine configurations in datacenters and cloud infrastructure.

Presently, a database server machine may be configured such that the database client machines are predetermined and the relationship between the database server machine and the database client machines is predetermined. However, the illustrative embodiments recognize that many multi-machine configurations are not always configured or known a priori. For example, when cloud resources are allocated to a cloud customer, the customer can often configure those resources flexibly into numerous virtual machines, physical machines, or some combination thereof, operating in any type or number of dependent relationships that suit the customer's needs at the time. Furthermore, such relationships can be dynamic where the relationships, the participating machines, or both can change over time or with changing customer needs.

Thus, the illustrative embodiments recognize that it is not always possible to have a predetermined set of machines in a set of predetermined relationships in a multi-machine environment. Increasingly, complex configurations that require multiple machines to work together to perform a business service are being deployed in highly dynamic environments. The interrelated machines have to be maintained without disrupting the business service or the operation of other related machines. Thus, the illustrative embodiments recognize that performing maintenance operation on a machine that participates in a dynamic multi-system configuration requires coordination with other machines to successfully quiesce the environment, apply maintenance, and return the environment to a running state.

SUMMARY

The illustrative embodiments provide a method, system, and computer program product. An embodiment includes a method that constructs a plan for performing maintenance on a plurality of interrelated machines, the plan comprising a plurality of groups of tasks. The embodiment causes, using a processor and a memory, a maintenance task in a first group from the plurality of groups to execute within a window of time allocated for the maintenance. The embodiment determines that an estimated amount of time needed to execute a second group of tasks from the plurality of groups is more than a remaining time in the window. The embodiment omits, responsive to the determining, executing the second group of tasks. The embodiment completes the execution of a post-requisite task of the first group. The embodiment executes a maintenance task in the second group during a second window of time allocated for the maintenance. Thus, the embodiment solves a problem where all the maintenance tasks cannot be performed within a given time window and the embodiment enables omitting the tasks that cannot be performed in the given time window and still allowing at least some maintenance tasks, which do fit the time window, to be selected and completed.

Another embodiment further includes in the estimated amount of time, a second estimated amount of time needed to complete the execution of the post-requisite task of the first group. Thus, the embodiment solves a problem where some maintenance tasks cannot be completed without performing some post-requisite tasks by allowing at least some maintenance tasks, which do fit the time window, to be executed to completion by ensuring the execution of the tasks that needed to be completed after the maintenance activity has been performed, i.e., executing their post-requisite tasks.

Another embodiment further causes to execute, during the window, a prerequisite task in the first group prior to causing the maintenance task of the first group to execute. The embodiment causes to re-execute, during the second window, the prerequisite task in the first group prior to causing the maintenance task of the second group to execute. Thus, the embodiment solves a problem where some maintenance tasks cannot be completed without performing some prerequisite tasks by allowing at least some maintenance tasks, which do fit the time window, to be executed to completion by ensuring the execution of the tasks that needed to be completed before the maintenance activity has been performed, i.e., executing their prerequisite tasks, and then re-executing the prerequisite tasks of the completed tasks to setup the system state again during another time window where another previously omitted maintenance task can be executed.

Another embodiment further configures in the plan a third group, such that the third group executes in parallel with the first group. The embodiment causes another task in the third group from the plurality of groups to execute in parallel with the maintenance task of the first group. Thus, the embodiment solves a problem where insufficient time window is available to serially perform some maintenance tasks. The embodiment allows some maintenance tasks to execute parallelly to fit the time window.

Another embodiment further configures in the plan a third group, such that the third group executes in parallel with the first group, and wherein the first group and the third group have a common prerequisite task. The embodiment configures the prerequisite task to execute in the first group before the maintenance task of the first group. The embodiment causes another task in the third group from the plurality of groups to execute in parallel with the maintenance task of the first group. Thus, the embodiment solves a problem where insufficient time window is available to serially perform some maintenance tasks. The embodiment allows some common prerequisite tasks from several groups to execute in the time window, followed by some maintenance tasks to execute parallelly to fit the time window.

Another embodiment further configures in the plan a third group, such that the third group executes within the first group. The embodiment causes a post-requisite task in the third group to execute prior to the post-requisite task of the first group. Thus, the embodiment solves a problem where some maintenance tasks cannot be completed without performing some post-requisite tasks by allowing those maintenance tasks, which do fit the time window, to be executed to completion by ensuring the execution of the tasks that needed to be completed after the maintenance activity has been performed, i.e., executing their post-requisite tasks.

Another embodiment further configures in the plan a third group, such that the third group executes in parallel with the second group. The embodiment computes that a third estimated amount of time needed to execute the third group of tasks is at most equal to the remaining time in the window. The embodiment causes, responsive to the computing, executing the third group of tasks. Thus, the embodiment solves the problem of maximizing the maintenance tasks in a given time window by progressively determining, as the time of the window progresses, whether some tasks can be executed in parallel in the remaining time of the window, and doing so when possible.

In an embodiment, a first machine in the plurality of machines is related to a second machine through a dynamically formed dependency without being preconfigured in the dependency. Thus, the embodiment solves the problem of maximizing the maintenance activities in multi-machine configurations where the multi-machine configuration is defined on the fly as needed.

Another embodiment further configures in the first group of tasks, a prerequisite task, where the prerequisite task has to be performed prior to performing the maintenance task in the first group. The embodiment configures in the first group of tasks, a post-requisite task, wherein the post-requisite task has to be performed after performing the maintenance task of the first group. Thus, the embodiment solves the problem of maximizing the maintenance tasks that can be completed with their prerequisite tasks and post-requisite tasks within a given window in a multi-machine environment.

Another embodiment includes a computer usable program product comprising a computer readable storage device including computer usable code. The embodiment includes computer usable code for constructing a plan for performing maintenance on a plurality of interrelated machines, the plan comprising a plurality of groups of tasks. The embodiment includes computer usable code for causing, using a processor and a memory, a maintenance task in a first group from the plurality of groups to execute within a window of time allocated for the maintenance. The embodiment includes computer usable code for determining that an estimated amount of time needed to execute a second group of tasks from the plurality of groups is more than a remaining time in the window. The embodiment includes computer usable code for omitting, responsive to the determining, executing the second group of tasks. The embodiment includes computer usable code for completing the execution of a post-requisite task of the first group. The embodiment includes computer usable code for executing a maintenance task in the second group during a second window of time allocated for the maintenance. Thus, the embodiment provides a computer usable program product to solve a problem where all the maintenance tasks cannot be performed within a given time window and the computer usable program product of the embodiment enables omitting the tasks that cannot be performed in the given time window and still allowing at least some maintenance tasks, which do fit the time window, to be selected and completed.

Another embodiment includes a data processing system. The embodiment includes a storage device, wherein the storage device stores computer usable program code. The embodiment includes a processor, wherein the processor executes the computer usable program code. The embodiment includes computer usable code for constructing a plan for performing maintenance on a plurality of interrelated machines, the plan comprising a plurality of groups of tasks. The embodiment includes computer usable code for causing, using a processor and a memory, a maintenance task in a first group from the plurality of groups to execute within a window of time allocated for the maintenance. The embodiment includes computer usable code for determining that an estimated amount of time needed to execute a second group of tasks from the plurality of groups is more than a remaining time in the window. The embodiment includes computer usable code for omitting, responsive to the determining, executing the second group of tasks. The embodiment includes computer usable code for completing the execution of a post-requisite task of the first group. The embodiment includes computer usable code for executing a maintenance task in the second group during a second window of time allocated for the maintenance. Thus, the embodiment provides a data processing system to solve a problem where all the maintenance tasks cannot be performed within a given time window and the data processing system of the embodiment enables omitting the tasks that cannot be performed in the given time window and still allowing at least some maintenance tasks, which do fit the time window, to be selected and completed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a flowchart representation of an example execution of another maintenance plan with parallelly executable tasks in accordance with an illustrative embodiment; and FIG. 8 depicts a flowchart representation of an example execution of another maintenance plan with parallelly executable and nested tasks in accordance with an illustrative embodiment.

DETAILED DESCRIPTION

Figure 1:
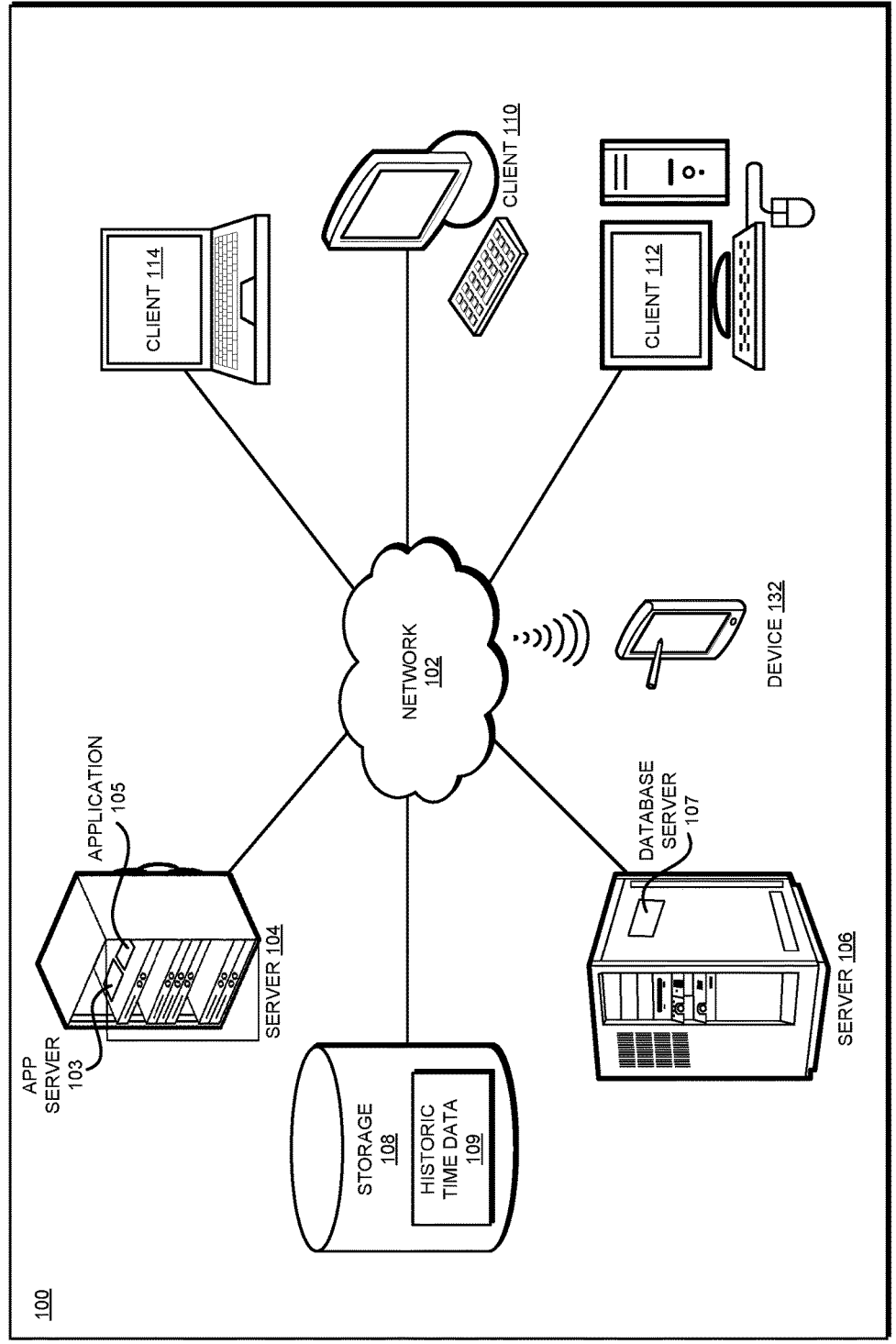
FIG. 1 depicts a block diagram of a network of data processing systems in which illustrative embodiments may be implemented.

The illustrative embodiments used to describe the invention generally address and solve the above-described problems and other problems related to maintaining dynamic multi-machine configurations in largescale data processing environments.

An embodiment can be implemented as a software application. The application implementing an embodiment can be configured as a modification of an existing maintenance scheduling engine and/or administration system, as a separate application that operates in conjunction with an existing maintenance scheduling engine and/or administration system, a standalone application, or some combination thereof.

An embodiment sets up a maintenance plan (also interchangeably referred to herein as a "plan"). A maintenance plan includes a set of maintenance tasks that is to be performed on a set of machines in a multi-machine configuration. A maintenance plan further includes a set of roll-in tasks, a set of roll-out tasks, or both. In some cases, no roll-in tasks may be needed. In some cases, no roll-out tasks may be needed. In some cases, a set of roll-in tasks and a set of roll-out tasks may be needed. In some cases, one or more sets of roll-in tasks and a one or more sets of roll-out tasks may be needed.

A roll-in task is a task that has to be performed on at least one machine in the set of machines before a maintenance task from the maintenance plan can be performed on that machine or some other machine in the set of machines. In other words, a roll-in task is a prerequisite task or a preparatory task for a maintenance task in the maintenance plan. Some examples of a roll-in task include but are not limited to completing an operation, performing a specific operation, omitting a specific operation, changing an operation, terminating a connection, establishing a connection, changing a dependency of a machine or process from one machine or process to another machine or process, sending a notification, and the like.

A roll-out task is a task that has to be performed on at least one machine in the set of machines after a maintenance task from the maintenance plan has been performed on that machine or some other machine in the set of machines. In other words, a roll-out task is a post-requisite task or a preparatory task for returning a machine to normal operation after performing a maintenance task from the maintenance plan. Some examples of a roll-out task include but are not limited to completing an operation, performing a specific operation, omitting a specific operation, changing an operation, terminating a connection, establishing a connection, changing a dependency of a machine or process from one machine or process to another machine or process, sending a notification, and the like.

An embodiment determines a length of time that will likely be needed to execute or perform the maintenance plan. For example, the embodiment estimates an amount of time for each roll-in task in the plan, each maintenance task in the plan and each roll-out task in the plan, and computes a total of such estimated amounts of time. The computed total is the estimated time to execute the maintenance plan on the set of machines.

A historical repository saves one or more actual time periods consumed in executing a roll-in task or a similar task on a particular machine or a similar machine in the past. Similarly, the historical repository saves one or more actual time periods consumed in executing a roll-out task or a similar task on a particular machine or a similar machine in the past. Similarly, the historical repository saves one or more actual time periods consumed in executing a maintenance task or a similar task on a particular machine or a similar machine in the past. Using such data from the historical repository, one embodiment computes the estimated execution times of various maintenance tasks, roll-in tasks, roll-out tasks, or a plan as a whole.

There may be limitations on maintenance windows in a data processing environment. In other words, there may be limits on how long a machine can be taken away from normal operations for maintenance. A plan may include several maintenance tasks, all of which may not be possible within a given maintenance window.

One embodiment determines whether a maintenance task in a plan can be configured to execute in parallel with another maintenance task in the plan. For example, changing a hardware component while applying a software patch may not be possible in a given machine but applying a software patch and adding a software upgrade may be executed in parallel in the machine. Similarly, changing a hardware component in one machine while applying a software patch in another machine may be possible in a given set of machines.

These and many other combinations of maintenance tasks may be executable in parallel given the specific circumstances of the implementation of the embodiment. When two or more maintenance tasks can be configured to execute in parallel, the embodiment configures such parallelly executable maintenance tasks to execute in parallel in the set of machines under maintenance.

Not only singular tasks but multiple maintenance tasks can be executed in parallel in this manner. Within a given maintenance plan, maintenance tasks can be grouped. When possible, the embodiment can also configure one group of maintenance tasks to execute in parallel with another group of maintenance tasks.

In some cases, dependencies within the maintenance tasks may limit when a particular maintenance task can be executed. For example, given example tasks 1, 2, and 3, an embodiment determines that task 1 should not be initiated if all three tasks 1-3 cannot be completed in the given maintenance window. If all tasks in a given group cannot be completed within the window, the embodiment does not initiate any of the tasks in the group. Conversely, the embodiment initiates a task in the group only when all tasks in the group can be completed within the given maintenance window.

A maintenance task T1 in a given maintenance plan may need one set of roll-in tasks (R1) and one set of roll-out tasks (R2). Another maintenance task T2 in the given maintenance plan may need a different set of roll-in tasks (R3), a different set of roll-out tasks (R4), or both. Suppose that T1 needs R1 and R2, and T2 needs R3 and R4. Accordingly, an embodiment forms two groups of tasks within the plan. In a first group G1—(R1, T1, R2), R1 is executed, then T1 is executed, then R2 is executed. In a second group G2—(R3, T2, R4), R3 is executed, then T2 is executed, then R4 is executed.

The embodiment computes an estimated period P1 needed to execute G1 and an estimated period P2 needed to execute G2. Suppose that a maintenance window W is permissible for performing maintenance on a set of machines. If (P1+P2<=W), then the embodiment performs all tasks in G1 and G2. If (P1+P2>W), then the embodiment determines whether G1 can be performed without performing G2 and whether P1 is <=W. If G1 can be performed without performing G2 and P1 is <=W, the embodiment performs all tasks in G1. Similarly, if (P1+P2>W), then the embodiment determines whether G2 can be performed without performing G1 and whether P2 is <=W. If G2 can be performed without performing G1 and P2 is <=W, the embodiment performs all tasks in G2.

A maintenance task may be nested within another maintenance task. For example, an update of one software in one machine may trigger an update of another software in the same or different machine, or a change of a hardware component in one machine may trigger an installation of a different software in the same or different machine. Furthermore, the nesting task may have its own set of roll-in and roll-out tasks and the nested task may have its own roll-in and roll-out tasks. Any number of maintenance tasks can be nested in another maintenance task in a similar manner.

Suppose that the execution of the maintenance plan is initiated with a given window. During the execution, for a nested task, an embodiment determines whether the roll-in tasks of the nested task can be performed, the nested task can be performed, the roll-out tasks of the nested task can be performed and the roll-out tasks of the nesting task can be performed in the remaining time in the window. If not, the embodiment pauses or stops the execution of the plan, does not execute the roll-in tasks of the nested task, the nested task, or the roll-out tasks of the nested task, but performs the roll-out tasks of the nesting task and exits the plan.

During another maintenance window, the embodiment re-performs the roll-in tasks of the nesting task, then performs the roll-in tasks of the nested task, the nested task, and the roll-out tasks of the nested task. The embodiment may perform additional maintenance tasks if such tasks are configured in the plan and possible in the window, followed by the roll-out tasks of the nesting task.

Generally, an embodiment can perform a given maintenance plan in a variety of ways. For example, in one circumstance, the embodiment enters a maintenance plan by performing the roll-in tasks of a maintenance task, perform the maintenance task, performs any nested tasks with their roll-in and roll-out tasks if possible in a given maintenance window and the machine configuration, performs other maintenance tasks in parallel if possible in the window and the machine configuration, perform any roll-out tasks and exits the plan. In another example circumstance, the embodiment enters a maintenance plan by performing the roll-in tasks of a maintenance task, perform the maintenance task, omits performing a nested task with the corresponding roll-in and roll-out tasks if not possible in the window, may optionally perform other maintenance tasks in parallel if possible in the window and the machine configuration, perform any roll-out tasks needed before exiting the plan, and exits the plan.

Generally, if a maintenance window is insufficient to execute a next task in a plan, an embodiment can stop or pause the plan during the execution, finish an executing maintenance task, perform any roll-out tasks of the executing maintenance tasks and other preceding tasks or parallelly executed maintenance tasks and exit the plan. During another maintenance window, the embodiment re-executes all or some roll-in tasks needed to reach the pending or unperformed maintenance task in the plan, executes the unperformed task, perform any roll-out tasks of the executing maintenance tasks and other preceding tasks or parallelly executed maintenance tasks and exits the plan.

In order to determine whether to pause a plan, how much of a plan to execute, or both, the embodiment estimates the times needed to execute one or more remaining portions of the plan with all roll-out tasks of already executed or executing maintenance tasks completed. The embodiment suspends or omits a portion of the plan but performs a graceful exit from the plan by executing all roll-out tasks of already executed or executing maintenance tasks within the remaining time in the given maintenance window.

Depending on the structure of a specific plan, an embodiment may perform the same roll-in task multiple times to enter the plan multiple times during different maintenance windows. For example, the embodiment may have to perform the roll-in tasks of a maintenance task completed during a previous window to reach an incomplete maintenance task in the current window. For similar reasons, an embodiment may perform the same roll-out task multiple times to exit the plan multiple times during different maintenance windows. For example, the embodiment may have to perform the roll-out tasks of a maintenance task completed in a previous window to reach an incomplete maintenance task in the present window.

Within a given maintenance window, an embodiment may perform multiple roll-in tasks, multiple roll-out tasks, or both, depending on the specific needs of the maintenance tasks configured in the plan. Within a given maintenance window, an embodiment may perform a particular roll-in task multiple times, a particular roll-out task multiple times, or both, depending on the specific needs of the maintenance tasks configured in the plan.

An embodiment orders the maintenance tasks according to the priority associated with the tasks. For example, higher priority tasks may be configured sooner in the plan relative to lower priority tasks.

An embodiment orders or groups the maintenance tasks according to a characteristic of a subset of machines on which the tasks are to be performed. For example, the embodiment can be configured to group those tasks together which are to be performed on the machines with greater than a threshold amount of available idle time, so that resources available for maintenance can be maximized on such machines. As another example, the embodiment can be configured to group those tasks together which are to be performed on the machines with greater than a threshold speed, bandwidth, resources, or other similar characteristics, so that the amount of maintenance applied to such machines can be maximized within a given window.

These examples of characteristics-based groupings of maintenance tasks are not intended to be limiting. From this disclosure, those of ordinary skill in the art will be able to conceive many other characteristics, and other groupings based on such characteristics, and the same are contemplated within the scope of the illustrative embodiments.

An embodiment can also create roll-in tasks and perform them separately from the maintenance task to which they apply. For example, if a maintenance task performs an update, the embodiment can create a roll-in task to download the update ahead of the window. Furthermore, the embodiment can execute a roll-in task, such as the roll-in task of downloading the update, outside the window to maximize the allocation of the window to the actual maintenance tasks.

A method of an embodiment described herein, when implemented to execute on a device or data processing system, comprises substantial advancement of the functionality of that device or data processing system towards performing maintenance activities in a multi-machine data processing environment. For example, presently available methods for providing maintenance does not account for the dynamic dependencies of a machine or process on other machines or processes on other machines when scheduling the maintenance tasks. An embodiment provides a method by which a machine's interdependencies are analyzed at the time of the maintenance, e.g., just prior to the maintenance window. Based on the analysis, an embodiment creates one or more sets of roll-in tasks, one or more sets of roll-in tasks roll-out tasks, and a maintenance plan with optional parallelly executable maintenance tasks, optional nested maintenance tasks, or some combination thereof. An embodiment estimates the time to perform a remaining portion of a maintenance plan during the execution of the plan and determines whether a remaining amount of the current maintenance window is sufficient to perform the remaining portion. The embodiment pauses the plan—having performed some maintenance tasks but not all, and exits the plan. The embodiment reenters the plan during another window to re-perform some or all roll-in and roll-out tasks of the previously completed maintenance tasks, and to perform a previously omitted portion of the plan. This manner of managing maintenance operations in multi-machine configurations is unavailable in the presently available methods. Thus, a substantial advancement of such devices or data processing systems by executing a method of an embodiment is performing dependency-sensitive maintenance in dynamic multi-machine configurations, and in performing incremental maintenance without requiring large maintenance windows for the entire maintenance activity.

The illustrative embodiments are described with respect to certain machines, maintenance tasks, roll-in tasks, roll-out tasks, times, estimates, plans, windows, ordering, grouping, execution or re-execution, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
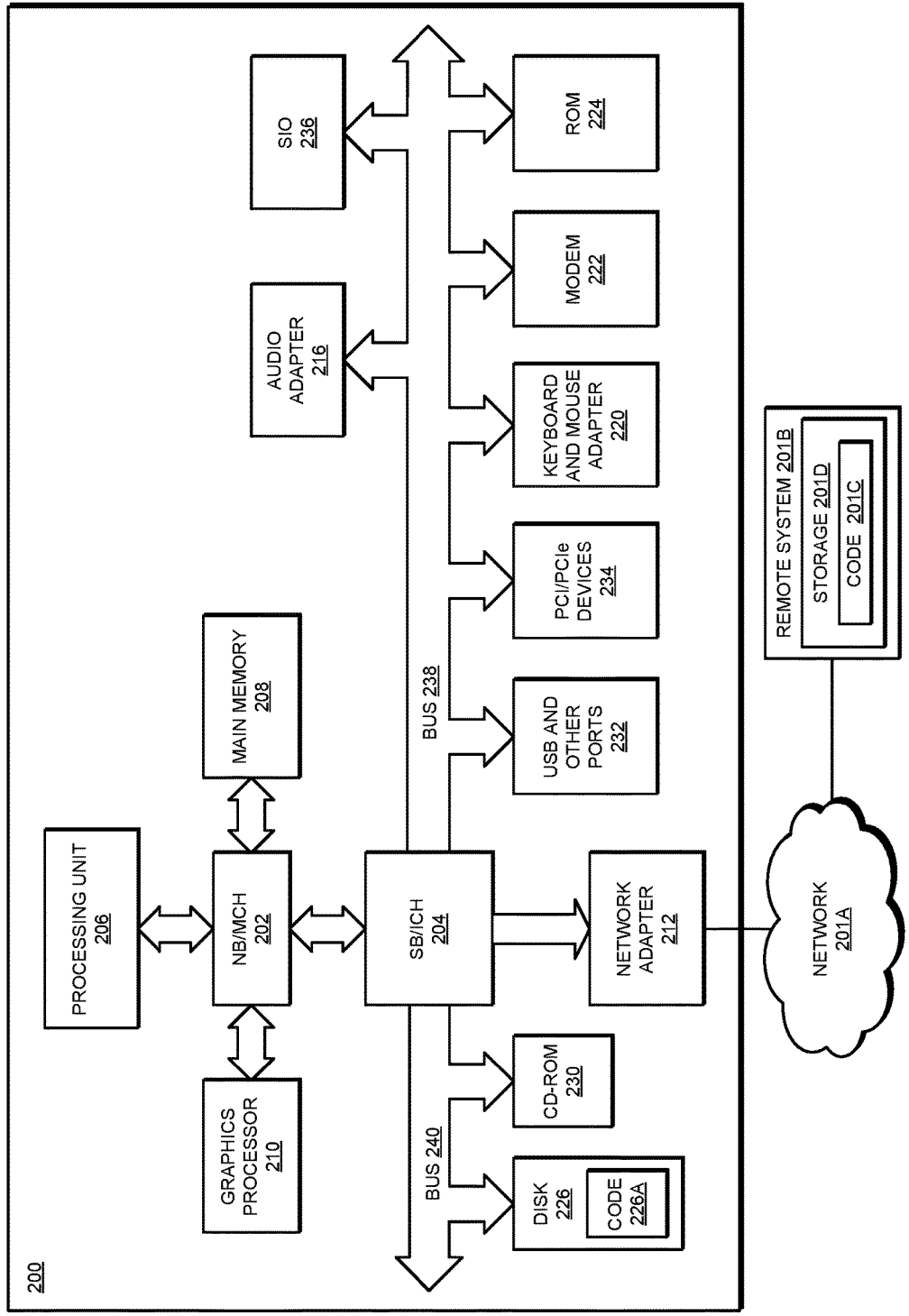
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. App server 103 and database server 107 are example interdependent systems operating and causing interdependencies between machine 104 and machine 106, or VMs executing therein (not shown). Application 105 prepares and executes a maintenance plan using historic time data 109 to estimate the execution times as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
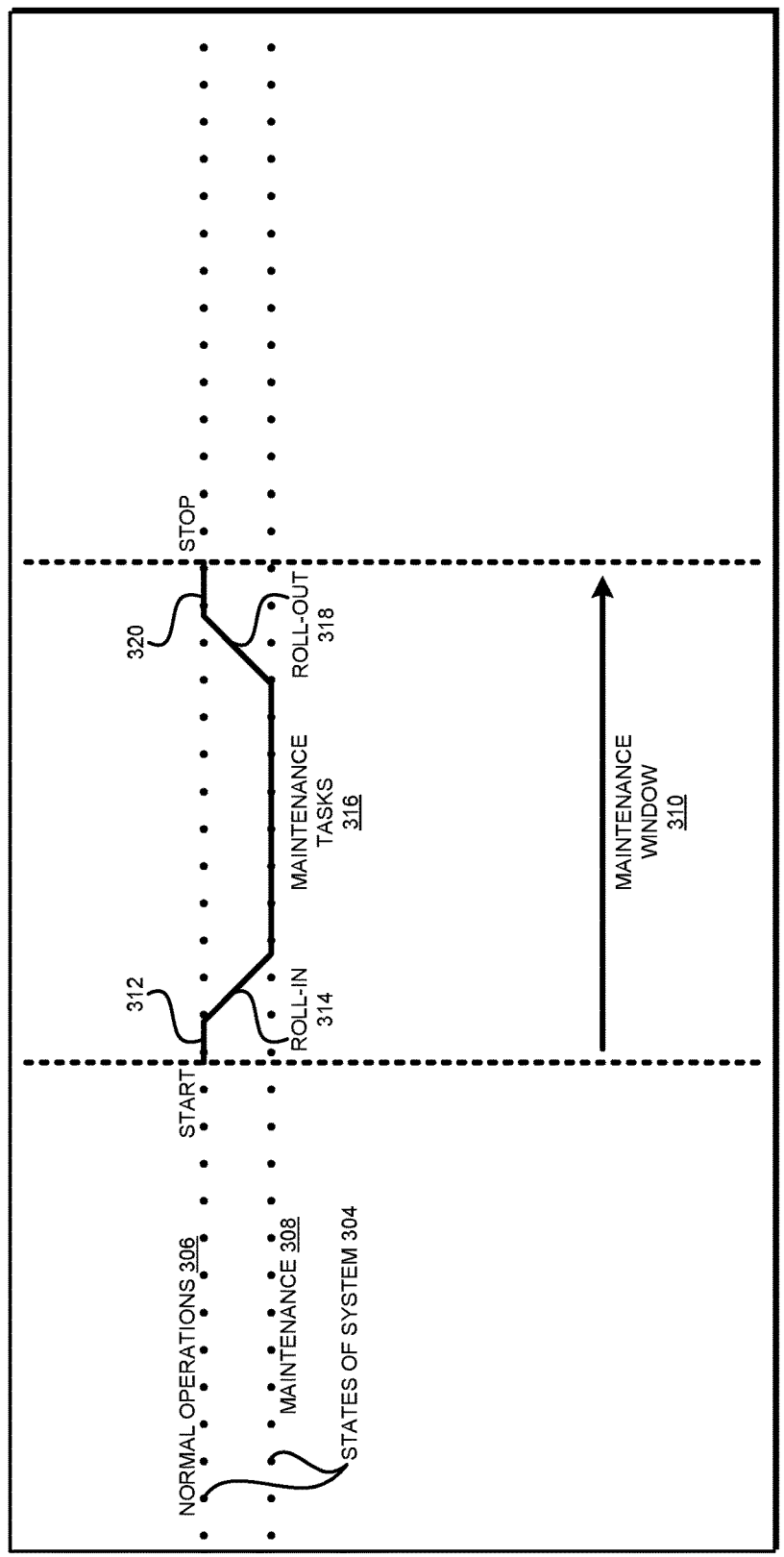
FIG. 3 depicts a graph representation of an example execution of a maintenance plan in accordance with an illustrative embodiment.

With reference to FIG. 3, this figure depicts a graph representation of an example execution of a maintenance plan in accordance with an illustrative embodiment. Application 105 in FIG. 1 prepares and executes the maintenance plan whose execution is represented in graph 302.

Only as a non-limiting example, assume that shown states 304 are of a system that is an example of server 104 in FIG. 1, and the system participates in a multi-machine configuration as described herein. State 306 represents the state where the system is performing normal operations. State 308 represents the state where maintenance is performed on the system. Further assume a simple and non-limiting example maintenance plan with one set of roll-in tasks prior to one set of maintenance tasks, and followed by one set of roll-out tasks.

Window 310 is a maintenance window during which maintenance can be performed on the system. In phase 312 during window 310, the application enters maintenance mode 308. A task from the maintenance plan may be scheduled during phase 312, but generally, the system may consume the time during phase 312 to wind-down active processes and transition from normal operations 306 to maintenance mode 308.

The application performs, or causes to be performed, the roll-in tasks from the example maintenance plan during phase 314. The application performs, or causes to be performed, the maintenance tasks from the example maintenance plan during phase 316. The application performs, or causes to be performed, the roll-out tasks from the example maintenance plan during phase 318.

In phase 320 during window 310, the application exits maintenance mode 308 to resume normal operations 306. A task from the maintenance plan may be scheduled during phase 320, but generally, the system may consume the time during phase 320 to wind-up normal operation processes and transition from maintenance mode 308 to normal operations 306.

Figure 4:
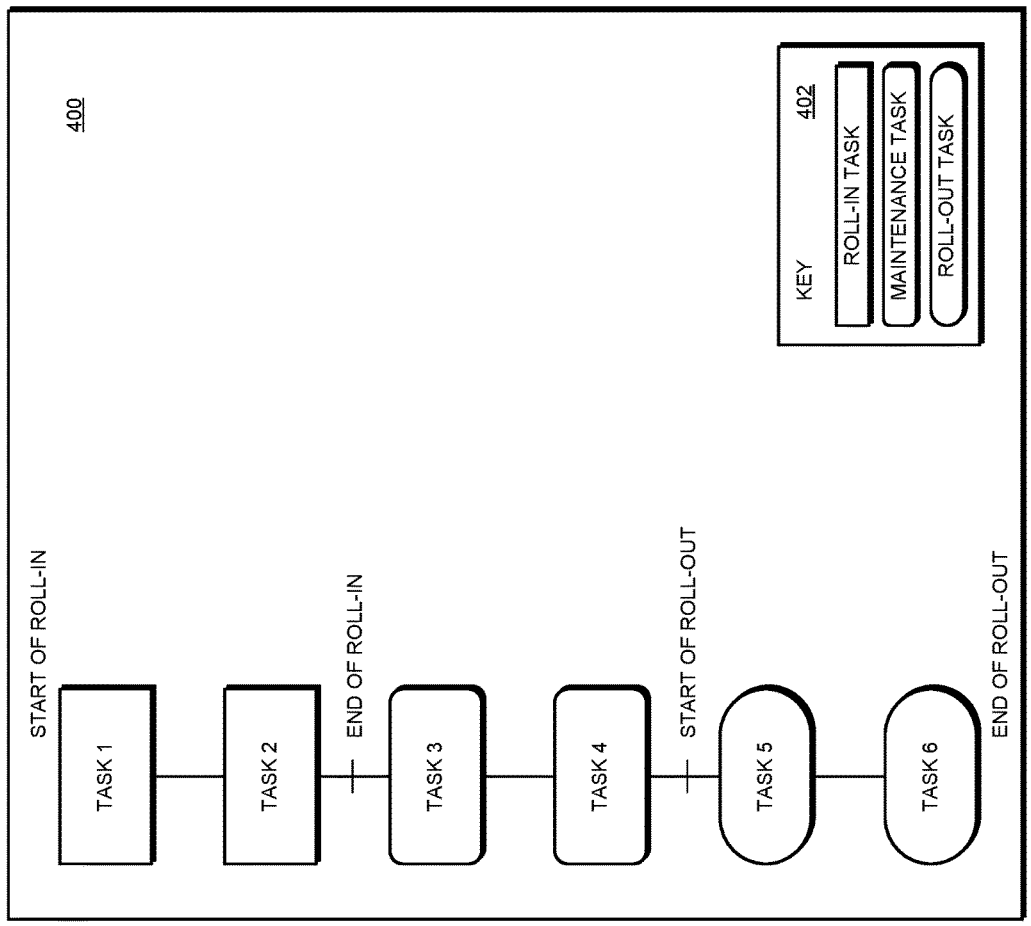
FIG. 4 depicts a flowchart representation of an example execution of a maintenance plan in accordance with an illustrative embodiment.

With reference to FIG. 4, this figure depicts a flowchart representation of an example execution of a maintenance plan in accordance with an illustrative embodiment. Application 105 in FIG. 1 prepares and executes the maintenance plan whose execution is represented in process 400. Legend or key 402 illustrates the symbols used to represent the various types of tasks in process 400. For example, the sharp-cornered rectangular blocks used in process 400 represent the roll-in tasks, the rounded-cornered rectangular blocks used in process 400 represent the maintenance tasks, and the elongated oval blocks used in process 400 represent the roll-out tasks of the example maintenance plan.

Only as a non-limiting example, assume that process 400 applies to the configuration and operations described with respect to graph 302 in FIG. 3. The application starts roll-in phase 314 and executes roll-in task 1 and roll-in task 2.

Upon completion of task 2, roll-in phase 314 ends and maintenance phase 316 begins. The application starts maintenance phase 314 and executes maintenance task 3 and maintenance task 4.

Upon completion of task 4, maintenance phase 316 ends and roll-out phase 318 begins. The application starts roll-out phase 318 and executes roll-out task 5 and roll-out task 6. Process 400 ends thereafter.

Note that only two tasks in each of the roll-in phase, the maintenance phase, and the roll-out phase are depicted only as a non-limiting example. Any number of roll-in tasks, maintenance tasks, and roll-out tasks can be similarly configured in this simple plan. More complex plans and manner of performing them are described with respect to other figures.

Figure 5:
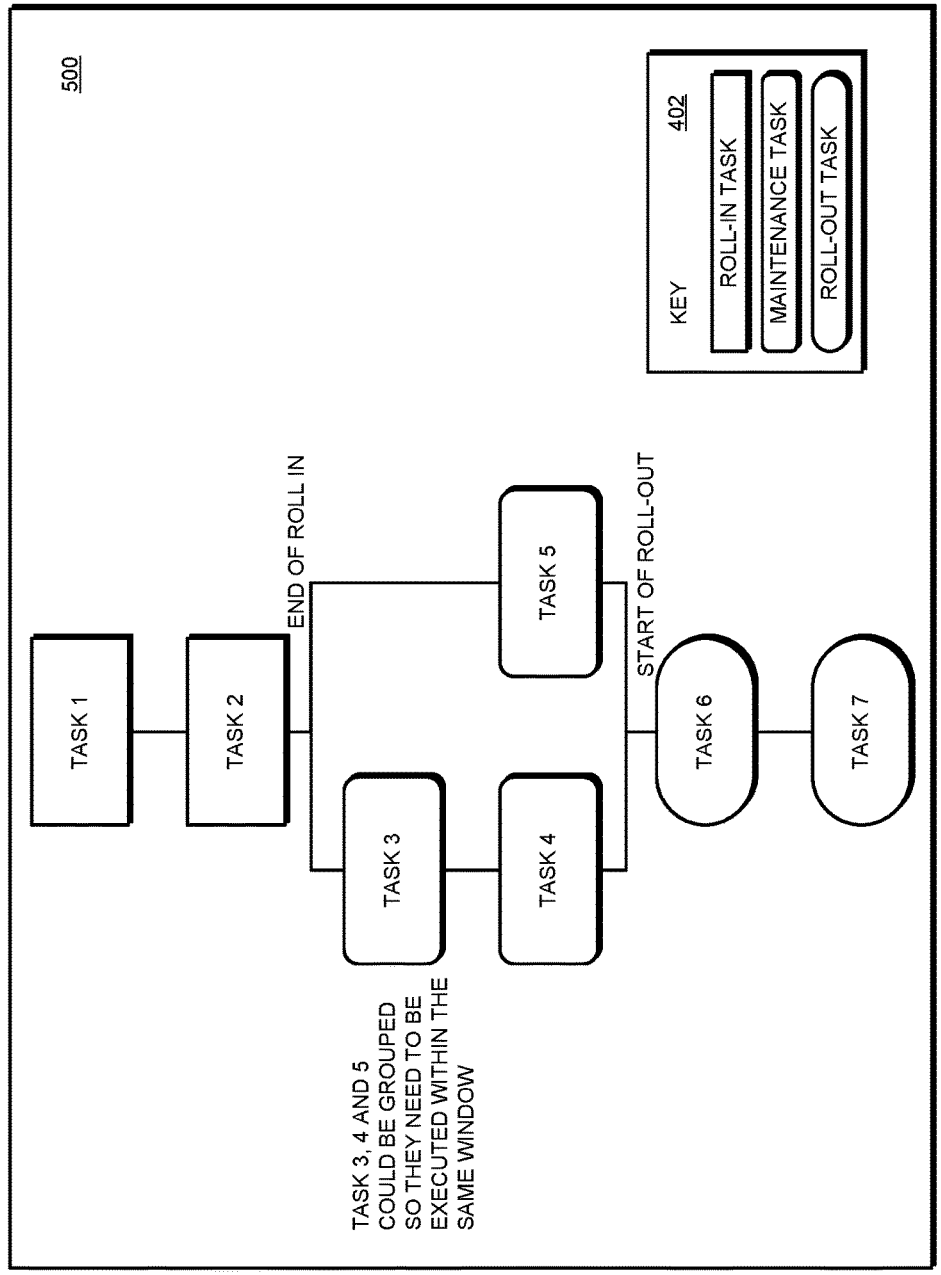
FIG. 5 depicts a flowchart representation of an example execution of another maintenance plan in accordance with an illustrative embodiment.

With reference to FIG. 5, this figure depicts a flowchart representation of an example execution of another maintenance plan in accordance with an illustrative embodiment. Application 105 in FIG. 1 prepares and executes the maintenance plan whose execution is represented in process 500. Legend or key 502 illustrates the symbols used to represent the various types of tasks in process 500 in a manner similar to key 402 in FIG. 4.

Only as a non-limiting example, assume that process 500 applies to the configuration and operations described with respect to graph 302 in FIG. 3. Further assume that two sets of maintenance tasks can be performed in parallel in the maintenance plan and that the two sets of maintenance tasks share a common set of roll-in tasks.

The application starts roll-in phase 314 and executes roll-in task 1 and roll-in task 2, which form the common set of roll-in tasks. Upon completion of task 2, roll-in phase 314 ends and maintenance phase 316 begins.

Suppose that task 5 can be executed in parallel with tasks 3 and 4. Accordingly, the application starts maintenance phase 314 and executes maintenance task 3 and maintenance task 5 in parallel. Task 4 follows task 3 upon completion of task 3.

Upon completion of tasks 4 and 5, maintenance phase 316 ends and roll-out phase 318 begins. The application starts roll-out phase 318 and executes roll-out task 6 and roll-out task 7. Process 500 ends thereafter.

Figure 6:
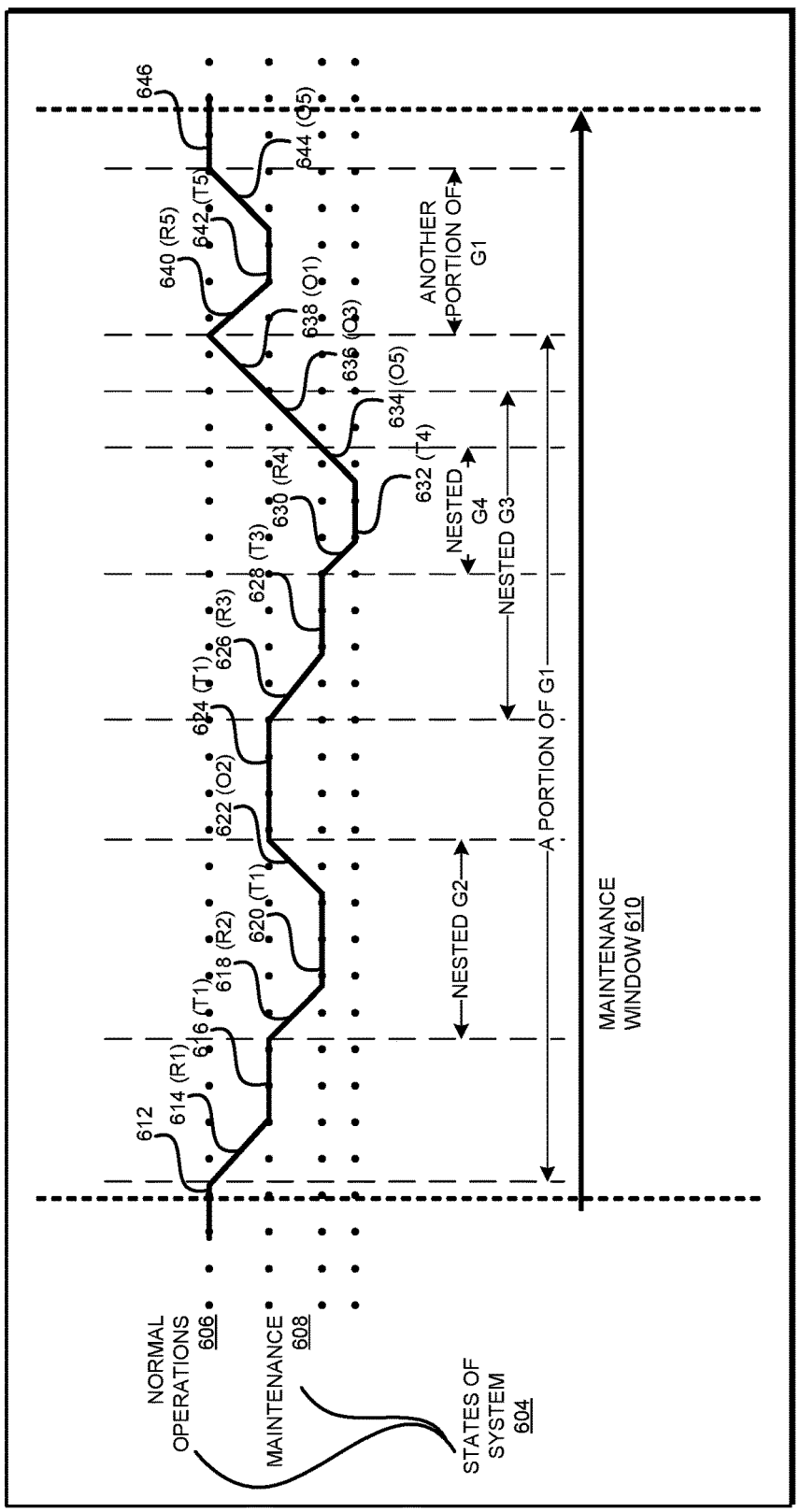
FIG. 6 depicts a graph representation of an example execution of a more complex maintenance plan in accordance with an illustrative embodiment.

With reference to FIG. 6, this figure depicts a graph representation of an example execution of a more complex maintenance plan in accordance with an illustrative embodiment. Application 105 in FIG. 1 prepares and executes the example complex maintenance plan whose execution is represented in graph 602.

The example complex maintenance plan includes a group of tasks (G1). Group G1 includes some roll-in tasks (R1, R5), some maintenance tasks (T1, T5), and some roll-out tasks (O1, O5). Group G1 further includes group of tasks G2, which is nested or wholly contained within group G1. Group G2 includes some roll-in tasks (R2), some maintenance tasks (T2), and some roll-out tasks (O2). Group G1 further includes group of tasks G3, which is nested or wholly contained within group G1. Group G3 includes some roll-in tasks (R3), some maintenance tasks (T3), and some roll-out tasks (O3). Group G3 includes group of tasks G4, which is nested or wholly contained within group G3. Group G4 includes some roll-in tasks (R4), some maintenance tasks (T4), and some roll-out tasks (O4).

Only as a non-limiting example, assume that states 604 shown are of a system that is an example of server 104 in FIG. 1, and the system participates in a multi-machine configuration as described herein. State 606 represents the state where the system is performing normal operations. State 608 represents the state where maintenance is performed on the system.

Window 610 is a maintenance window during which maintenance can be performed on the system. In phase 612 during window 610, the application enters maintenance mode 608. Generally, the system may consume the time during phase 612 to wind-down active processes and transition from normal operations 606 to maintenance mode 608.

The application enters group G1 and performs, or causes to be performed, R1 tasks during phase 614. The application performs, or causes to be performed, some of the T1 tasks during phase 616. The application enters group G2 and performs, or causes to be performed, R2 tasks during phase 618. The application performs, or causes to be performed, some of the T1 tasks during phase 620. The application performs, or causes to be performed, the O2 tasks during phase 622 and exits group G2.

The application performs, or causes to be performed, some more T1 tasks during phase 624. The application enters group G3 and performs, or causes to be performed, R3 tasks during phase 626. The application performs, or causes to be performed, some of the T3 tasks during phase 628.

The application enters group G4 and performs, or causes to be performed, R4 tasks during phase 630. The application performs, or causes to be performed, some of the T4 tasks during phase 632.

The application performs, or causes to be performed, the O5 tasks during phase 634 and exits group G4. The application performs, or causes to be performed, the O3 tasks during phase 636 and exits group G3. The application performs, or causes to be performed, the O1 tasks during phase 638 and exits one portion of group G1.

The application enters another portion of group G1 and performs, or causes to be performed, R5 tasks during phase 640. The application performs, or causes to be performed, the T5 tasks during phase 642. The application performs, or causes to be performed, the O5 tasks during phase 644 and exits group G1.

If tasks (R5, T5, O5) could be executed in parallel with tasks (R1, T1, O1) within group G1, phases 640, 642, and 644 would be shifted left (not shown) somewhere between phase 612 and phase 638. Other groups or portions thereof can be similarly shifted and executed parallelly (not shown) in the manner depicted in FIG. 5.

In phase 646 during window 610, the application exits maintenance mode 608 to resume normal operations 606. Generally, the system may consume the time during phase 646 to wind-up normal operation processes and transition from maintenance mode 608 to normal operations 606.

With reference to FIG. 7, this figure depicts a flowchart representation of an example execution of another maintenance plan with parallelly executable tasks in accordance with an illustrative embodiment. Application 105 in FIG. 1 prepares and executes the maintenance plan whose execution is represented in process 700. Legend or key 702 illustrates the symbols used to represent the various types of tasks in process 700 in a manner similar to key 502 in FIG. 5.

Only as a non-limiting example, assume that process 700 applies to the configuration and operations described with respect to graph 602 in FIG. 6. Further assume that two sets of maintenance tasks can be performed in parallel in the maintenance plan and that the two sets of maintenance tasks share a common set of roll-in tasks.

Roll-in task 1, maintenance task 2, and roll-out task 3 form maintenance group 1. The application executes roll-in task 1, which forms the common set of roll-in tasks. Upon completion of task 1, the application executes maintenance task 2 followed by roll-out task 3.

Roll-in task 4, maintenance task 5, and roll-out task 6 form maintenance group 2. Roll-in task 7, maintenance task 8, and roll-out task 9 form maintenance group 3.

Suppose that task 5 can be executed in parallel with task 8. Before executing group 2, the application determines whether task 3 is complete and sufficient time remains in the maintenance window to complete tasks 4, 5, and 6. If either of those conditions is negative, the application exits process 700 at exit point A if group 3 also cannot be performed. If task 3 has been completed and group 3 can be performed within the remaining window, the application allows group 3 to finish executing and exits process 700 at exit point B. If both of those conditions are affirmative, i.e., task 3 is complete and sufficient time remains in the maintenance window to complete tasks 4, 5, and 6, the application executes roll-in task 4, maintenance task 5, and roll-out task 6.

In parallel with the above-described processing of group 3, the application performs a similar analysis for group 3. Before executing group 3, the application determines whether task 3 is complete and sufficient time remains in the maintenance window to complete tasks 7, 8, and 9. If either of those conditions is negative, the application omits performing group 3. The application exits process 700 at exit point A if group 2 also cannot be performed. If task 3 has been completed and group 2 can be performed within the remaining window, the application allows group 2 to finish executing and exits process 700 at exit point B. If both of those conditions are affirmative, i.e., task 3 is complete and sufficient time remains in the maintenance window to complete tasks 7, 8, and 9, the application executes roll-in task 7, maintenance task 8, and roll-out task 9.

Roll-in tasks 10 and 11, maintenance tasks 12 and 13, and roll-out task 14 form maintenance group 4. The application performs a similar analysis for group 4. Before executing group 4, the application determines whether tasks 6 and 9 have completed and sufficient time remains in the maintenance window to complete tasks 10, 11, 12, 13, and 14. If either of those conditions is negative, the application omits performing group 4 and exits process 700 at exit point B. If both of those conditions are affirmative, i.e., tasks 6 and 9 have been completed and sufficient time remains in the maintenance window to complete tasks 10-14, the application executes roll-in tasks 10 and 11, maintenance tasks 12 and 13, and roll-out task 14. Process 700 ends thereafter.

With reference to FIG. 8, this figure depicts a flowchart representation of an example execution of another maintenance plan with parallelly executable and nested tasks in accordance with an illustrative embodiment. Application 105 in FIG. 1 prepares and executes the maintenance plan whose execution is represented in process 800. Legend or key 802 illustrates the symbols used to represent the various types of tasks in process 800 in a manner similar to key 702 in FIG. 7.

Only as a non-limiting example, assume that process 800 applies to the configuration and operations described with respect to graph 602 in FIG. 6.

Roll-in task 1, roll-in task 2, maintenance task 3, and roll-out tasks 12, 13, and 14 form maintenance group 1. Roll-in task 4, maintenance task 5, and roll-out task 6 form maintenance group 2. Roll-in task 7, maintenance task 8, and roll-out task 9 form maintenance group 3. maintenance tasks 10 and 11 form maintenance group 4. Assume that groups 2 and 3 can be performed in parallel in the maintenance plan, that the parallelly executable groups 2 and 3 are nested within group 1. Further assume that group 4 can also be nested within group 1 and serialized with the other nested groups in the plan.

With the maintenance plan configured in this manner, the application executes roll-in task 1, roll-in task 2, followed by maintenance task 3.

Before executing group 2, the application determines whether task 3 is complete and sufficient time remains in the maintenance window to complete tasks 4, 5, 6, and roll-out tasks 12, 13, and 14 of group 1 whose maintenance task has already executed. If either of those conditions is negative, the application performs roll-out tasks 12, 13, and 14 of group 1 and exits process 800 at the marked exit point if group 3 also cannot be performed together with tasks 12-14. If task 3 has been completed and group 3 can be performed with tasks 12-14 within the remaining window, the application allows group 3 to finish executing, omits group 4, performs roll-out tasks 12-14, and exits process 800 at the exit point. If both of those conditions are affirmative, i.e., task 3 is complete and sufficient time remains in the maintenance window to complete tasks 4, 5, 6, and 12-14, the application executes roll-in task 4, maintenance task 5, and roll-out task 6.

In parallel with the above-described processing of group 2, the application performs a similar analysis for group 3. Before executing group 3, the application determines whether task 3 is complete and sufficient time remains in the maintenance window to complete tasks 7, 8, 9, and roll-out tasks 12-14 of group 1 whose maintenance task has already executed. If either of those conditions is negative, the application performs roll-out tasks 12, 13, and 14 of group 1 and exits process 800 at the marked exit point if group 2 also cannot be performed together with tasks 12-14. If task 3 has been completed and group 2 can be performed with tasks 12-14 within the remaining window, the application allows group 2 to finish executing, omits group 4, performs roll-out tasks 12-14, and exits process 800 at the exit point. If both of those conditions are affirmative, i.e., task 3 is complete and sufficient time remains in the maintenance window to complete tasks 7, 8, 9, and 12-14, the application executes roll-in task 7, maintenance task 8, and roll-out task 9.

After group 2, group 3, or both groups 2 and 3 have executed, the application performs a similar analysis for group 4. Before executing group 4, the application determines whether tasks 6 and 9 have completed and sufficient time remains in the maintenance window to complete maintenance tasks 10 and 11 of group 4 and roll-out tasks 12, 13, and 14 of group 1 whose maintenance task has already executed. If either of those conditions is negative, the application omits performing group 4, performs only roll-out tasks 12-14, and exits process 800 at the exit point. If both of those conditions are affirmative, i.e., tasks 6 and 9 have been completed and sufficient time remains in the maintenance window to complete tasks 10-14, the application executes maintenance tasks 10 and 11, and roll-out tasks 12 and 13, and 14. Process 800 ends thereafter.

Thus, a computer implemented method, system or apparatus, and computer program product are provided in the illustrative embodiments for managing maintenance operations in multi-machine configurations and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
  constructing a plan for performing maintenance on a plurality of interrelated machines, the plan comprising a plurality of groups of tasks;

causing, using a processor and a memory, a maintenance task in a first group from the plurality of groups to execute within a window of time allocated for the maintenance;

determining that an estimated amount of time needed to execute a second group of tasks from the plurality of groups is more than a remaining time in the window;

omitting, responsive to the determining, executing the second group of tasks;

executing a maintenance task in the second group during a second window of time allocated for the maintenance; and configuring in the plan a third group, such that the third group executes in parallel with the first group, wherein the first group and the third group have a common prerequisite task.

2. The method of claim 1, further comprising:
including in the estimated amount of time, a second estimated amount of time needed to complete the execution of a post-requisite task of the first group.

3. The method of claim 1, further comprising:
causing to execute, during the window, a prerequisite task in the first group prior to causing the maintenance task of the first group to execute;
causing to re-execute, during the second window, the prerequisite task in the first group prior to causing the maintenance task of the second group to execute.

4. The method of claim 1, further comprising:
configuring in the plan a third group, such that the third group executes in parallel with the first group; and
causing another task in the third group from the plurality of groups to execute in parallel with the maintenance task of the first group.

5. The method of claim 1, further comprising:
configuring the prerequisite task to execute in the first group before the maintenance task of the first group;
completing the execution of a post-requisite task of the first group; and
causing another task in the third group from the plurality of groups to execute in parallel with the maintenance task of the first group.

6. The method of claim 1, further comprising:
configuring in the plan a third group, such that the third group executes within the first group; and
causing a post-requisite task in the third group to execute prior to the post-requisite task of the first group.

7. The method of claim 1, further comprising:
configuring in the plan a third group, such that the third group executes in parallel with the second group;
computing that a third estimated amount of time needed to execute the third group of tasks is at most equal to the remaining time in the window;
causing, responsive to the computing, executing the third group of tasks.

8. The method of claim 1, wherein a first machine in the plurality of machines is related to a second machine through a dynamically formed dependency without being preconfigured in the dependency.

9. The method of claim 1, further comprising:
configuring in the first group of tasks, a prerequisite task, where the prerequisite task has to be performed prior to performing the maintenance task in the first group;
configuring in the first group of tasks, a post-requisite task, wherein the post-requisite task has to be performed after performing the maintenance task of the first group.

10. A computer-usable program product comprising a computer-readable storage device including computer-usable code, the computer-usable code comprising:
computer-usable code for constructing a plan for performing maintenance on a plurality of interrelated machines, the plan comprising a plurality of groups of tasks;
computer-usable code for causing, using a processor and a memory, a maintenance task in a first group from the plurality of groups to execute within a window of time allocated for the maintenance;
computer-usable code for determining that an estimated amount of time needed to execute a second group of tasks from the plurality of groups is more than a remaining time in the window;
computer-usable code for omitting, responsive to the determining, executing the second group of tasks;
computer-usable code for executing a maintenance task in the second group during a second window of time allocated for the maintenance; and
computer-usable code for configuring in the plan a third group, such that the third group executes in parallel with the first group, wherein the first group and the third group have a common prerequisite task.

11. The computer-usable program product of claim 10, further comprising:
computer-usable code for including in the estimated amount of time, a second estimated amount of time needed to complete the execution of a post-requisite task of the first group.

12. The computer-usable program product of claim 10, further comprising:
computer-usable code for causing to execute, during the window, a prerequisite task in the first group prior to causing the maintenance task of the first group to execute;
computer-usable code for causing to re-execute, during the second window, the prerequisite task in the first group prior to causing the maintenance task of the second group to execute.

13. The computer-usable program product of claim 10, further comprising:
computer-usable code for configuring in the plan a third group, such that the third group executes in parallel with the first group; and
computer-usable code for causing another task in the third group from the plurality of groups to execute in parallel with the maintenance task of the first group.

14. The computer-usable program product of claim 10, further comprising:
computer-usable code for configuring the prerequisite task to execute in the first group before the maintenance task of the first group;
computer-usable code for completing the execution of a post-requisite task of the first group; and
computer-usable code for causing another task in the third group from the plurality of groups to execute in parallel with the maintenance task of the first group.

15. The computer-usable program product of claim 10, further comprising:
computer-usable code for configuring in the plan a third group, such that the third group executes within the first group; and
computer-usable code for causing a post-requisite task in the third group to execute prior to the post-requisite task of the first group.

16. The computer-usable program product of claim 10, further comprising:

computer-usable code for configuring in the plan a third group, such that the third group executes in parallel with the second group;

computer-usable code for computing that a third estimated amount of time needed to execute the third group of tasks is at most equal to the remaining time in the window;

computer-usable code for causing, responsive to the computing, executing the third group of tasks.

17. The computer-usable program product of claim 10, wherein a first machine in the plurality of machines is related to a second machine through a dynamically formed dependency without being preconfigured in the dependency.

18. The computer-usable program product of claim 10, wherein the computer-usable code is stored in a computer-readable storage device in a data processing system, and wherein the computer-usable code is transferred over a network from a remote data processing system.

19. The computer-usable program product of claim 10, wherein the computer-usable code is stored in a computer-readable storage device in a server data processing system, and wherein the computer-usable code is downloaded over a network to a remote data processing system for use in a computer-readable storage device associated with the remote data processing system.

20. A data processing system, the data processing system comprising:

a storage device, wherein the storage device stores computer-usable program code; and a processor, wherein the processor executes the computer-usable program code, and wherein the computer-usable program code comprises:

computer-usable code for constructing a plan for performing maintenance on a plurality of interrelated machines, the plan comprising a plurality of groups of tasks;

computer-usable code for causing, using a processor and a memory, a maintenance task in a first group from the plurality of groups to execute within a window of time allocated for the maintenance;

computer-usable code for determining that an estimated amount of time needed to execute a second group of tasks from the plurality of groups is more than a remaining time in the window;

computer-usable code for omitting, responsive to the determining, executing the second group of tasks;

computer-usable code for executing a maintenance task in the second group during a second window of time allocated for the maintenance; and computer-usable code for configuring in the plan a third group, such that the third group executes in parallel with the first group, wherein the first group and the third group have a common prerequisite task.

* * * * *